United States Patent
Sastri et al.

(10) Patent No.: US 9,422,196 B2
(45) Date of Patent: Aug. 23, 2016

(54) TRANSPARENT POLYCRYSTALLINE CERAMIC MATERIAL

(71) Applicants: Suri A Sastri, Lexington, MA (US); Mohan babu Ramisetty, Burlington, MA (US)

(72) Inventors: Suri A Sastri, Lexington, MA (US); Mohan babu Ramisetty, Burlington, MA (US)

(73) Assignee: SURMET CORPORATION, Burlington, MA (US)

( * ) Notice: Subject to any disclaimer, the term of this patent is extended or adjusted under 35 U.S.C. 154(b) by 14 days.

(21) Appl. No.: 14/152,921

(22) Filed: Jan. 10, 2014

(65) Prior Publication Data
US 2014/0364299 A1    Dec. 11, 2014

Related U.S. Application Data

(60) Provisional application No. 61/780,962, filed on Mar. 13, 2013.

(51) Int. Cl.
| | |
|---|---|
| C04B 35/58 | (2006.01) |
| C04B 35/10 | (2006.01) |
| C04B 35/115 | (2006.01) |
| C04B 35/117 | (2006.01) |
| C04B 35/634 | (2006.01) |
| C04B 35/645 | (2006.01) |
| C04B 37/00 | (2006.01) |

(52) U.S. Cl.
CPC .............. *C04B 35/10* (2013.01); *C04B 35/115* (2013.01); *C04B 35/117* (2013.01); *C04B 35/634* (2013.01); *C04B 35/6455* (2013.01); *C04B 37/001* (2013.01); *C04B 37/005* (2013.01); *C04B 37/008* (2013.01); *C04B 2235/3208* (2013.01); *C04B 2235/3217* (2013.01); *C04B 2235/3222* (2013.01); *C04B 2235/3869* (2013.01); *C04B 2235/604* (2013.01); *C04B 2235/6027* (2013.01); *C04B 2235/722* (2013.01); *C04B 2235/77* (2013.01); *C04B 2235/96* (2013.01); *C04B 2235/9653* (2013.01); *C04B 2237/562* (2013.01)

(58) Field of Classification Search
CPC .... C04B 35/58; C04B 35/581; C04B 35/597; C04B 41/5067; C04B 2235/3852
See application file for complete search history.

(56) References Cited

U.S. PATENT DOCUMENTS

| | | | | |
|---|---|---|---|---|
| 4,241,000 A | * | 12/1980 | McCauley | C04B 35/581 264/1.21 |
| 5,096,862 A | * | 3/1992 | Mathers | C04B 35/115 501/118 |
| 5,231,062 A | * | 7/1993 | Mathers | C04B 35/115 106/35 |
| 7,163,656 B1 | * | 1/2007 | Gilde | C04B 35/117 264/667 |

OTHER PUBLICATIONS

Rigopoulous, N., O'Donnell, R., Oh, A., & Trigg, M. (2009). An Investigation of the Solid Solubility Between Aluminium Oxynitride and Magnesium Aluminate Spinels. Journal of the Australian Ceramic Society, 45[1], 35-38.

(Continued)

*Primary Examiner* — Noah Wiese

(57) ABSTRACT

A high performance transparent polycrystalline ceramic material is provided. The transparent polycrystalline ceramic material has a nitrogen-containing isotropic lattice structure and having 80% optical transmission at a wavelength between 3.86 and 4.30 microns through said material at 11 mm of thickness.

6 Claims, 1 Drawing Sheet

(56) References Cited

OTHER PUBLICATIONS

Granon et al. (1995). Aluminum Magnesium Oxynitride: A New Transparent Spinel Ceramic. Journal of the European Ceramic Society, 15, 249-254.

Harris, D. (1998). Durable 3-5 mm transmitting infrared window materials. Infrared Physics & Technology 39, 185-201.

Grannon et al. (1994). Reactivity in the Al2O3—AlN—MgO System. The MgAlON Spinel Phase. Journal of the European Ceramic Society, 13 (1994) 365-370.

* cited by examiner

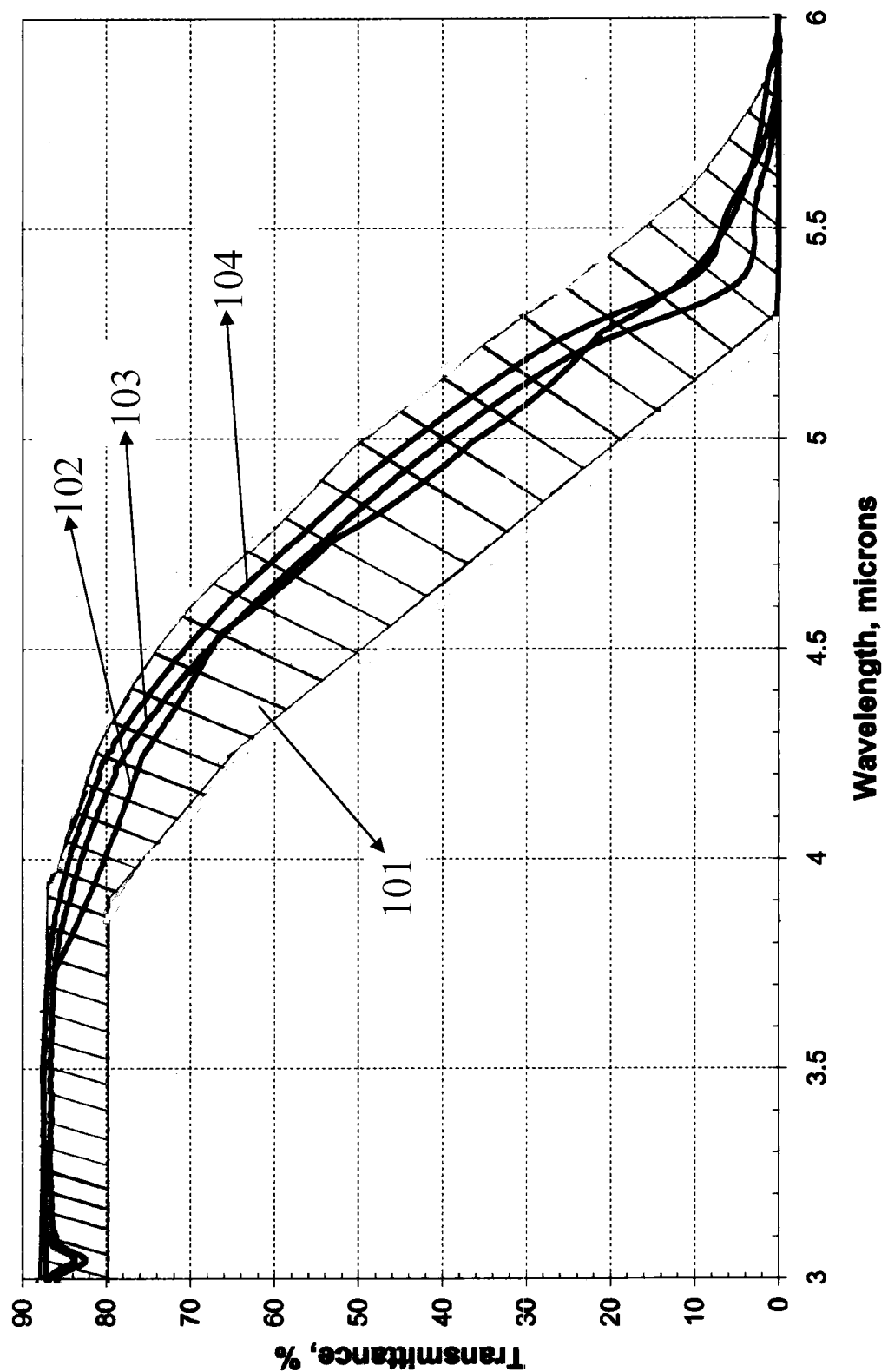

TRANSPARENT POLYCRYSTALLINE CERAMIC MATERIAL

PRIORITY APPLICATION

This application claims priority under 35 U.S.C. §119(e) to U.S. Provisional Application No. 61/780,962, filed on 13 Mar. 2013, the disclosure of which is expressly incorporated by reference herein in its entirety.

BACKGROUND OF THE INVENTION

Functionality of modern smart munitions such as destroyer war ships including DDG 1000, high energy lasers, counter MANPAD systems, and laser guided missiles, depend on the availability of special window or dome materials that are transparent in the visible through infrared (IR) wavelength region of the electro-magnetic spectrum. To be effective, these materials must combine IR transmission property with high strength and durability as well as being amenable to cost effective large scale manufacturing and precision fabrication into small and large components to exacting specifications.

Sapphire has found wide spread use in such modern military applications as electro-optic sensor windows and reconnaissance windows. Its strength and durability enable it to meet the demanding requirements of military applications, such as rain and sand erosion, heat, vibration, g-loading and shock resistance, and, in naval applications, resistance to waveslap loads. Sapphire is a single crystal grown from molten aluminum oxide in the shape of a cylindrical boule at high temperature, from which windows and domes have to be fabricated by slicing, cutting, grinding and polishing. Sapphire, has a combination of good mechanical properties and mid IR transparency in the 0.2 to 4.5 micron wavelength range, but also suffers from certain limitations. Monocrystalline sapphire is difficult and expensive to grow, particularly in large sizes. Further, with specific regard to surveillance aircraft window applications, it is undesirably heavy and suffers from optical birefringence due to its anisotropic rhombohedral crystal structure. Moreover, domes, lenses and other three-dimensional shapes must be cored out from boules, which makes it extremely expensive and almost unaffordable in many of the applications.

Therefore, a need exists to provide an alternative material to sapphire that is highly transparent and durable, while being easier to manufacture, of lighter weight, and avoiding the limiting optical birefringence issues associated with sapphire's anisotropic crystal structure.

SUMMARY OF THE INVENTION

The present invention generally is directed to a transparent polycrystalline ceramic material and a method of forming the transparent polycrystalline ceramic material.

In one embodiment, the invention is directed to a transparent polycrystalline ceramic material having a nitrogen-containing isotropic cubic lattice structure. The transparent polycrystalline ceramic material has an 80% optical transmission for one or more wavelength values between 3.86 and 4.30 microns through the material at 11 mm of thickness.

In another embodiment, the invention is directed to a nitrogen-containing spinel powder having a magnesium content of about 10 to about 16 weight percent.

In yet another embodiment, the invention is directed to a method of forming a transparent polycrystalline ceramic material that includes the steps of forming a mixture comprising at least one magnesium cation compound and at least one aluminum cation compound; molding the mixture into a green article having a desired shape; and heat treating and densifying the green article to greater than 99% theoretical density to form the transparent polycrystalline ceramic material.

Thus provided is a transparent polycrystalline ceramic material alternative to sapphire that is highly transparent, durable, and easier to manufacture than sapphire, while not suffering from the optical problems associated with sapphire's anisotropic structure.

BRIEF DESCRIPTION OF THE DRAWINGS

In the accompanying drawing:

FIG. 1. is illustration of the ranges of optical transmittance spectra at wavelengths between 3 and 6 microns for transparent polycrystalline ceramic materials according to the present invention.

DETAILED DESCRIPTION OF THE INVENTION

The features and details of the invention will now be more particularly described with reference to the accompanying drawings and pointed out in the claims. It will be understood that the particular embodiments of the invention are shown by way of illustration and not as limitations of the invention.

The novel features of this invention can be employed in various embodiments without departing from the scope of the invention. While the material and methods of the present invention are described with respect to military applications, it is understood that the present invention is useful in a multitude of applications, for example, as a durable alternative to glass-based screen covers for handheld devices such as tablets, smartphones, and other electronic devices; dental devices, such as orthodontic brackets; ferrules; and windows for chemical processing equipment and high-temperature ovens. Other medical applications include prosthetic implants for hip and joint replacements. Other applications include transparent armor panels and protective windows, jewelry, watch crystals, laser windows, solid state lasers, phosphors, LEDs, ceramic prosthesis, scintillators, radiation detection, medical equipment, electronic devices, electrostatic clamps, windows for oil and gas drilling equipment, RF devices, Graded Refractive Index (GRIN) lenses, credit cards, camera lenses, and cutting edges and tools.

The invention generally relates to a polycrystalline ceramic material having a cubic crystal structure and an isotropic optical transmission in the mid-IR that is equal to or better than that of sapphire. The transparent polycrystalline ceramic material also has transmittance in the near ultraviolet, visible, and mid-wave infrared wavelengths. Starting in the form of a powder, the material of this invention is amenable to conventional low cost ceramic processing techniques including formation into sintered and densified optical blanks which are then further fabricated to precision optical components such as reconnaissance windows, electro-optic sensor windows, windows for armor panels, lenses, night vision goggles, and missile domes of very large sizes and with different three-dimensional geometries.

In one embodiment, the invention is directed to a transparent polycrystalline ceramic material having a nitrogen-containing isotropic cubic spinel lattice. At a thickness of about 11 mm, the transparent polycrystalline ceramic material has an 80% optical transmission for one or more wavelength values between 3.86 and 4.30 microns through the material. Additionally, the transparent polycrystalline ceramic material may have a 50% optical transmission for one or more wavelength values between 4.5 and 5.0 microns through the material at 11 mm of thickness.

This feature is illustrated in FIG. 1, which shows optical transmittance spectra for embodiments of the present invention at wavelengths between 3 and 6 microns. Region 101 represents the range of optical transmittance that can be achieved by various embodiments of the transparent polycrystalline ceramic material. For example, it is possible to obtain 80% or more transmittance in the mid-IR region at one or more wavelengths between 3.86 and 4.30 microns through the material at 11 mm of thickness. Lines 103 and 104 represent optical transmittance spectra for specific embodiments of the transparent polycrystalline ceramic material. In comparison to the transmittance spectrum line 102 of sapphire, it can be seen that the embodiments shown in line 103 and line 104 exhibit superior transmittance to that of sapphire at 11 mm thickness in the wavelength range shown. At 11 mm thickness, the ceramic material represented by lines 103 and 104 have an 80% or more transmittance up to a wavelength of 4.15 and 4.24 microns respectively, compared to 80% transmission cut-off at 4.01 microns for sapphire. These different transmittance ranges in the mid-wave infrared wavelength region can be achieved by varying the material's composition ratio. It should be noted that the isotropic cubic phase of the polycrystalline ceramic material from the current invention exists for a range of multiple compositions.

It should be appreciated that as used herein, the term "nitrogen-containing" refers to more than trace amounts of nitrogen. For example, the nitrogen content may range between about 0.25 to about 2.10 weight percent. The transparent polycrystalline ceramic material includes magnesium at about 10 to about 16 weight percent. Further, properties of the transparent polycrystalline ceramic material may be altered by the addition of one or more dopants.

Dopants such as rare earth oxides or sources of rare earth cations such as Eu, Gd, Te, Tb, La, Y, Yb, Ce, Nd, Dy, Lu, Sm, etc. or silica, manganese dioxide, alkaline earth oxides or gallium cation containing compounds or a combination thereof can be added to the transparent polycrystalline ceramic material to modify its properties, such as its lattice constant, refractive index, transmission cut-off wavelengths, phosphorescence/luminescence, scintillating behavior, lasing, and color, provided that the added dopant forms solid solution with the transparent polycrystalline ceramic material compositions.

The transparent polycrystalline ceramic material of the present invention exhibits a Knoop hardness between about 1500 to about 1750 kg/mm$^2$ at 200 g load, more specifically, between about 1550 to about 1700 kg/mm$^2$ at 200 g load, and still more specifically between about 1550 and about 1650 kg/mm$^2$ at 200 g load, which is substantial, given that the transparent polycrystalline ceramic material is formed from a powder. By comparison, monocrystalline sapphire, which is typically grown from molten aluminum oxide, has a Knoop hardness ranging between about 1900 and about 2200 kg/mm$^2$, depending on its orientation. The transparent polycrystalline ceramic material has a density between about 3.59 to about 3.67 gm/cc, more preferably between about 3.59 to about 3.64 gm/cc, still more preferably between about 3.59 to about 3.63 gm/cc, and yet still more preferably between about 3.59 to about 3.61 gm/cc.

Unlike sapphire, which exhibits an undesirable optical birefringence due to its anisotropic structure, the transparent polycrystalline ceramic material has an isotropic lattice structure, and is therefore a singly refracting medium. The transparent polycrystalline ceramic material has a refractive index between 1.703 and 1.778 measured at 1064 nm wavelength of light using Nd:YAG laser. Additionally, the material exhibits a refractive index inhomogeneity root mean square of about less than 10 ppm over large aperture sizes of up to 8", 15", and even 22".

The transparent polycrystalline ceramic material according to the present invention may be produced by a method that includes forming a mixture of compounds that includes at least one magnesium cation compound and at least one aluminum cation compound. For example, the mixture may include a combination of one or more of oxides and/or hydroxides and/or nitrides and/or oxynitrides of aluminum and magnesium and/or any other compounds and/or sources of magnesium and/or aluminum cations, and/or anions of oxygen and/or nitrogen that form oxides and/or oxynitrides of magnesium and/or aluminum or both upon reaction. For example, the mixture may include aluminum oxynitride, aluminum oxide, and magnesium oxide. Other suitable mixtures include a magnesium cation compound, aluminum nitride and aluminum oxide; magnesium aluminate spinel and aluminum nitride; and magnesium aluminate spinel and aluminum oxynitride. The magnesium and aluminum cation containing compounds of the mixture are typically provided in powder form. The mixture itself may be simply a dry powder mixture of the compounds or a slurry mixture, such as, for example, a paste that includes the powder compounds and wet and/or dry additive Generally, the transparent polycrystalline ceramic material is formed by molding the mixture into a green article having a desired shape. This may be accomplished by using a variety of techniques, for example, by injection molding, gel casting, extrusion, 3D printing, cold isostatic pressing (CIP), die pressing, tape casting, roller compaction, or slip casting. Once the green article is formed, it is heat treated and densified to greater than 99% theoretical density.

In certain embodiments, the transparent polycrystalline ceramic material of the present invention is made through a process that includes forming a slurry from a powder mixture comprising aluminum oxynitride, aluminum oxide, and a magnesium cation compound, such as magnesium oxide, magnesium hydroxide, magnesium nitrate, magnesium sulfate, magnesium isopropoxide, magnesium chloride, magnesium nitride, magnesium oxynitride, magnesium acetate, magnesium citrate, magnesium phosphate and magnesium malate. The slurry is formed by mixing powders of aluminum oxynitride, aluminum oxide and the magnesium cation compound in a ball mill with grinding media, water and dispersant for a determined amount of time to a desired particle size. An organic binder, such as, for example, polyethylene glycol, polyvinyl alcohol, 2-ethyl-oxazoline homopolymers, polyvinylpyrrolidone, polymethyl methacrylate, polyethyl methacrylate, polybutyl methacrylate, poly-2-ethylhexyl methacrylate, polyethylene oxide, polypropylene oxide, polyacrylic acid, polycarbonate, methyl cellulose, ethyl cellulose, polyvinyl butyral, starch, etc. is then added to the milled slurry and the slurry is then screened and spray dried to form a precursor. The precursor, a spray dried powder, is then screened to remove large granules and chunks. The screened precursor is filled into a mold and isostatically pressed to form a green article having a desired shape or to a blank, which then can be machined to desired shape and size. The green article is then heated slowly to remove the organic binder and other additives, and then sintered to about 96 to 98% density relative to theoretical density to achieve closed porosity. Finally, the sintered article is then hot isostatically pressed (HIP) to further densify it to greater than 99% of its theoretical density to form the transparent polycrystalline ceramic material of the present invention.

Table 1 compares physical properties of a transparent polycrystalline ceramic material made in accordance with the present invention and that of sapphire. FIG. 1 compares the transmittance of the transparent polycrystalline ceramic material against that of single crystal sapphire in the wavelength range between 3 microns and 6 microns. In this range, the transparent polycrystalline ceramic material has equal or greater transmittance than sapphire. The optical transparency and monorefringence of the transparent polycrystalline ceramic material, combined with its durability and ease of manufacture, make it a highly needed and desirable alternative to sapphire.

TABLE 1

Physical Properties

|  | Transparent polycrystalline ceramic material | Sapphire |
| --- | --- | --- |
| Density | 3.60 +/− 0.01 g/cc | 3.98 g/cc |
| Refractive Index | 1.716-1.790 at 633 nm<br>1.703-1.778 at 1064 nm | 1.763 at 700 nm<br>1.757 at 1000 nm |
| Poisson's Ratio | N/A | 0.27-0.30, ORIENTATION DEPENDENT |
| Lattice Parameter | 0.807 +/− 0.001 nm | a-axis = 4.75<br>c-axis = 12.982 |

It should be appreciated that the properties of the transparent polycrystalline ceramic material according to the present invention are not limited to those values described above in Table 1, which is provided as an example. The transparent polycrystalline ceramic material of the present invention is versatile in that its physical properties, for example, infrared transmission cut-off wavelength, lattice parameter, refractive index, and density can be modified by altering the ratio of its composition and/or by adding dopants. The shaded region 101, shown in FIG. 1, illustrates a range of transmittance spectra for wavelengths of 3 to 6 microns that can be achieved by varying the ratio of the material's composition.

The present invention is further directed to a nitrogen-containing spinel powder having a magnesium content of about 10 to about 16 weight percent. The powder, when further processed (through shaping and heat treating) can be formed into the transparent polycrystalline ceramic material described above. The powder may be produced via typical carbothermal reduction and nitridation process in which precursors of aluminum oxide and/or hydroxide and magnesium oxide and/or hydroxide are mixed with carbon in appropriate ratios and heat treated in nitrogen containing atmosphere. Synthesized powder may then be subjected to oxidation to remove any excess unreacted carbon if necessary. Oxidized or synthesized nitrogen-containing spinel powder is then taken through series or single milling step to reduce the particles to a desired size. Other similar synthesis approaches such as direct nitridation, combustion synthesis, methano-thermal reduction and nitridation, spray pyrolysis, solid-state reaction, etc. are applicable for producing nitrogen-containing spinel powder of present invention. Chemical methods such as sol-gel, solution based precipation/co-precipitation/reverse precipitation, and the Pechini gel approach can also be used.

Monolithic windows formed of the transparent polycrystalline ceramic materials of the present invention have been made at dimensions significantly larger than that attainable using sapphire, for example, windows of 19"×27" have been formed using the methods in accordance with present invention. Such monoliths can range up to 50 mm in thickness and additionally can be formed into various shapes, including hemispherical domes, hyper-hemispherical domes, and lenses of sizes ranging up to 24 inches in diameter, as well as flat and curved windows of an area up to 1300 square inches. Ceramic articles to according to present invention that are otherwise difficult to fabricate into monolithic form (for example, armor laminates, large bonded windows, intricate three-dimensional shapes) can be bonded or laminated together using various types of bonding techniques including diffusion bonding, glass frit-assisted bonding, epoxy or polymer based bonding, etc. In addition, built-in or embedded internal structures such as but not limited to metallic grids, embedded heaters, metallic mesh, embedded sensors, porous channels, metallic wires, tubes, rods or any other features can be included within transparent ceramic articles made according to present invention. The features can be introduced before the heat treatment and during the powder processing, or after the heat treatment, followed by finishing to optical quality preserving some or all of the optical properties. Transparent ceramic articles described in the present invention can additionally receive an anti-reflection coating to further improve the optical properties.

EXEMPLIFICATION

Example 1

Tile or Disc Via Pressing

In this example, 5 to 35 weight percent of the powder mixture is aluminum oxynitride and the remainder is aluminum oxide or hydroxide and magnesium oxide or hydroxide in a 1:2 magnesium to aluminum cation ratio. The mixture is weighed and wet milled in a ball mill with a grinding media, such as water or a non-aqueous medium such as alcohol, and a dispersant for homogeneous mixing and milling. An organic binder is added to the slurry, and the slurry is then spray dried to form a powder. The spray dried powder is poured into a mold of a desired shape (e.g., a rectangular, square or circular shaped tile or disc) and pressed isostatically or uniaxially to pressures of 60 kpsi or higher to obtain a green body of the desired shape. The green body is then subjected to binder burnout followed by sintering and hot isostatic pressing to achieve>99% of theoretical density. The hot isostatically pressed tile or disc is then ground and polished to achieve optical transparency.

Example 2

Tile, Disc, Dome or Lens Via Slip Casting

The composition described in Example 1 is weighed and wet milled in a ball mill with grinding media, water and dispersant for homogeneity. Organic binder is added to the slurry, and the slurry is screened through fine mesh to remove particulates. The slurry is then cast by pouring into a porous mold of desired shape, such as rectangular or circular or square shaped tile or lens, a hyper-hemispherical or hemispherical dome, or any other useful shape. The porous mold can be made out of plaster of paris/gypsum, alumina, or any polymeric material.

The cast green body is then dried and subjected to binder burnout followed by sintering and hot isostatic pressing to achieve greater than 99% of theoretical density. The hot isostatic pressed tile or disc is then ground and polished to achieve optical transparency.

EQUIVALENTS

While this invention has been particularly shown and described with reference to preferred embodiments thereof, it will be understood by those skilled in the art that various changes in form and details may be made therein without departing from the scope of the invention encompassed by the appended claims.

What is claimed is:

1. A transparent polycrystalline ceramic material comprising:
   a nitrogen-containing isotropic lattice structure; and
   magnesium having a content of about 10 to about 16 weight percent,
   the material also having 80% optical transmission at a wavelength between 3.86 and 4.30 microns through said material at 11mm of thickness.

2. The transparent polycrystalline ceramic material of claim 1, further having a 50% optical transmission at a wavelength between 4.5 and 5.0 microns through said material at 11 mm of thickness.

3. The transparent polycrystalline ceramic material of claim 1, having a refractive index between 1.703 and 1.778 measured at 1064 nm wavelength of light using Nd:YAG laser.

4. The transparent polycrystalline ceramic material of claim 1, having a Knoop Hardness between about 1500 and about 1750 kg/mm$^2$ at 200 g load.

5. The transparent polycrystalline ceramic material of claim 1, having a density between 3.59 to 3.67 gm/cc.

6. The transparent polycrystalline ceramic material of claim 1, having a nitrogen content of about 0.25 to about 2.10 weight percent.

* * * * *